(No Model.)

L. C. TABER.
DRILL CHUCK.

No. 389,721. Patented Sept. 18, 1888.

WITNESSES:
C. L. Bendixen
J. J. Laass

INVENTOR
Loyal C. Taber
BY
Hull, Laass & Hull
ATTORNEYS

UNITED STATES PATENT OFFICE.

LOYAL C. TABER, OF SYRACUSE, ASSIGNOR TO WELLS VAN VALKENBURGH, CHARLES A. HATCH, CHARLES R. MEAD, VAN A. LACEY, AND EDWARD F. HASKELL, ALL OF ONEIDA, NEW YORK.

DRILL-CHUCK.

SPECIFICATION forming part of Letters Patent No. 389,721, dated September 18, 1888.

Application filed June 20, 1888. Serial No. 277,664. (No model.)

*To all whom it may concern:*

Be it known that I, LOYAL C. TABER, of Syracuse, in the county of Onondaga, in the State of New York, have invented new and useful Improvements in Chucks, of which the following, taken in connection with the accompanying drawings, is a full, clear, and exact description.

This invention relates to chucks designed more particularly for holding drills and analogous tools in line with the lathe-spindle, and is a specific improvement of the class of chucks which have the gripping-jaws pivoted to the head or body of the chuck.

Figure 1:
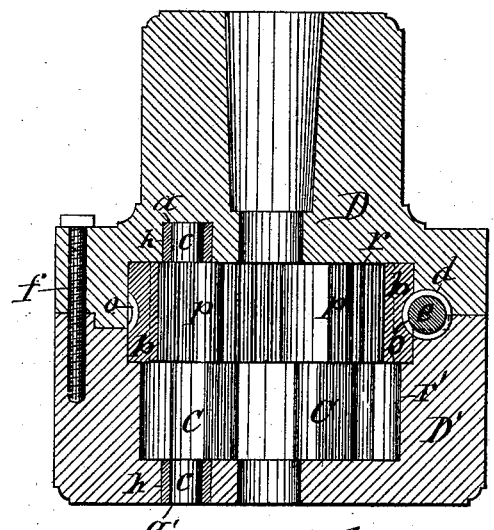
Figures 2, 3:
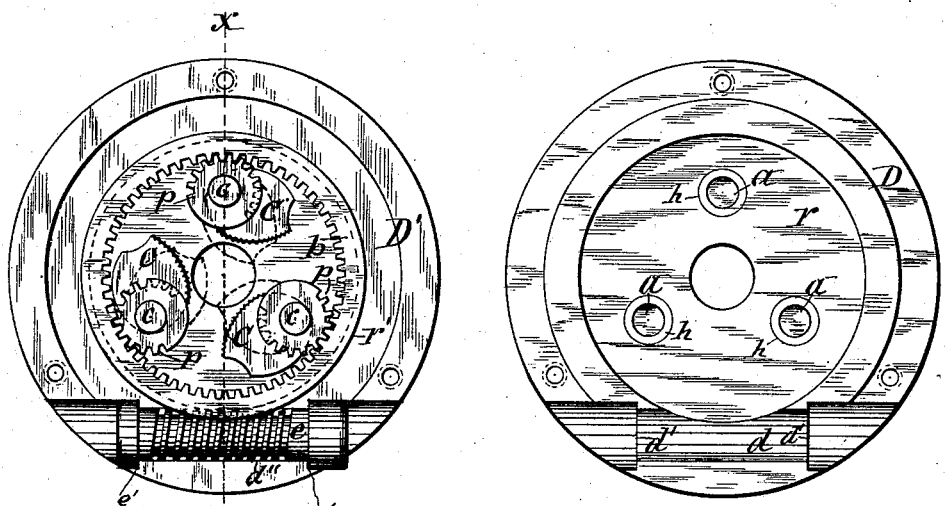
Figure 4:
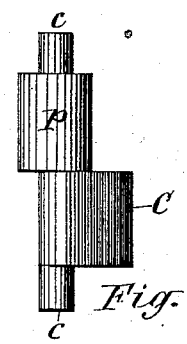

In the annexed drawings, Figure 1 is a longitudinal central section of a chuck embodying my improvements, and taken on the line $x\ x$, Fig. 3. Fig. 2 is a detached face view of the section of the chuck-head which is secured to the lathe-spindle when in use. Fig. 3 is a detached face view of the other section of the chuck-head with the jaws and their adjusting devices connected thereto, and Fig. 4 is a detached side view of one of the jaws.

Similar letters of reference indicate corresponding parts.

D and D' represent the two sections of the chuck-head, which is divided transversely and has its said two sections firmly secured to each other by means of bolts $f$, passing through one section and entering screw-threaded sockets in the other section, as shown, or by any other suitable and well-known means. Said sections D and D' are formed in their adjacent sides, respectively, with recesses $r$ and $r'$, concentric with the axis of the chuck. The inner face of the recess $r$ in the section D is provided with journal bearings or sockets $a\ a\ a$, equidistant from the axis of the chuck, and the opposite face of the recess $r'$ in the section D' is provided with journal bearings or eyes $a'\ a'\ a'$, coinciding with the journal-bearings $a\ a\ a$ in their positions in relation to the axis of the chuck-head. All of the said journal-bearings I prefer to line with a steel bushing, $h$, to insure their durability. The aforesaid chuck-head sections D D' are also formed in their adjacent sides, respectively, with grooves $d\ d''$, extending across said faces tangentially to the recesses $r\ r'$ and partly intersecting the same, said grooves being formed with shoulders $d'\ d'$, for the purpose hereinafter explained.

C C C denote the chuck-jaws, each of which is formed at opposite ends with trunnions $c\ c$, which are in line with each other and eccentric in relation to the jaws, and are journaled, respectively, in the sockets $a$ and $a'$.

Between the jaw C and the trunnion $c$, by which it is pivoted in the section D, is a pinion, $p$, concentric with the trunnions and rigidly attached to or formed integral with the jaw.

In the recess $r$ and partly in the recess $r'$ is seated a rotatable annular internally-toothed rack, $b$, which engages the pinions $p\ p\ p$ of the jaws. The exterior of said rack is formed with a spirally-threaded or screw-threaded groove, $o$, with which engages a screw, $e$, seated rotatably in the grooves $d\ d''$, hereinbefore described, said screw being provided with shoulders $e'\ e'$, which abut against the shoulders $d'\ d'$, and thereby prevent longitudinal movement of the screw. By turning the said screw on its axis the annular rack $b$ receives rotary motion, and by its engagement with the pinions $p\ p\ p$ causes the jaws C C C to swing either toward or from the axial center of the chuck, as indicated by dotted lines in Fig. 3 of the drawings.

What I claim as my invention is—

1. A chuck having its gripping-jaws pivoted eccentrically, pinions secured rigidly on said jaws, and an annular rack engaging the pinions to turn and universally adjust the jaws, as set forth.

2. The improved chuck consisting of the head composed of the separable sections D D', provided, respectively, with coinciding journal-bearings $a\ a'$, the jaws C C C, formed at opposite ends with trunnions $c\ c$, in line with each other and journaled in the aforesaid bearings, pinions $p$, rigidly secured to said jaws, the annular rack $b$, engaging said pinions and provided with a screw-threaded groove, $o$, and the adjusting-screw $e$, engaging said groove, substantially as described and shown.

3. The combination of the head-section D, formed with the recess $r$, the sockets $a\ a\ a$ in the inner face of said recess, and with the tangential groove $d$, having shoulders $d'\ d'$, the section D', formed with the recess $r'$, eyes $a'\ a'$ $a'$, coinciding with the sockets $a\,a\,a$, a groove, $d''$, coinciding with the groove $d$, the annular rack $b$, seated in the recess $r$ and partly in the recess $r'$ and provided with an external screw-threaded groove, $o$, the jaws C C C, formed with eccentric trunnions $c\,c\,c$, journaled in the sockets $a$ and eyes $a'$, pinions $p$, rigid on said jaws and concentric with the trunnions and meshing with the aforesaid rack, and the screw $e$, seated in the grooves $d\,d''$ and engaging the screw-threaded groove of the annular rack, all combined to operate substantially in the manner described and shown.

In testimony whereof I have hereunto signed my name, in the presence of two witnesses, at Syracuse, in the county of Onondaga, in the State of New York, this 8th day of June, 1888.

LOYAL C. TABER. [L. S.]

Witnesses:
JOHN J. LAASS,
H. M. SEAMANS.